(12) United States Patent
Murashita

(10) Patent No.: US 9,524,644 B2
(45) Date of Patent: Dec. 20, 2016

(54) NOTIFICATION CONTROL METHOD AND NOTIFICATION CONTROL DEVICE

(71) Applicant: FUJITSU LIMITED, Kawasaki-shi, Kanagawa (JP)

(72) Inventor: Kimitaka Murashita, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 14/027,806

(22) Filed: Sep. 16, 2013

(65) Prior Publication Data
US 2014/0139672 A1 May 22, 2014

(30) Foreign Application Priority Data

Nov. 21, 2012 (JP) ................................. 2012-255338

(51) Int. Cl.
| H04N 7/18 | (2006.01) |
| H04N 9/47 | (2006.01) |
| G08G 1/16 | (2006.01) |
| G06T 5/00 | (2006.01) |
| G06T 7/00 | (2006.01) |

(52) U.S. Cl.
CPC ............. *G08G 1/165* (2013.01); *G06T 5/007* (2013.01); *G06T 7/0002* (2013.01); *G08G 1/166* (2013.01); *G06T 2207/30168* (2013.01)

(58) Field of Classification Search
None
See application file for complete search history.

(56) References Cited

U.S. PATENT DOCUMENTS

| 6,169,572 | B1 | 1/2001 | Sogawa | |
| 2006/0050018 | A1* | 3/2006 | Hutzel | B60K 35/00 345/60 |
| 2008/0266424 | A1* | 10/2008 | Asoma | H04N 5/235 348/234 |
| 2011/0112719 | A1* | 5/2011 | Marumoto | B60R 21/00 701/33.4 |
| 2011/0261261 | A1 | 10/2011 | Mori et al. | |
| 2011/0285519 | A1* | 11/2011 | Scheuermann | B60Q 9/00 340/425.5 |
| 2012/0105672 | A1* | 5/2012 | Doepke | H04N 5/2353 348/229.1 |
| 2013/0016209 | A1* | 1/2013 | Taylor | B60C 23/0408 348/118 |

(Continued)

FOREIGN PATENT DOCUMENTS

| JP | 05-052608 | 3/1993 |
| JP | H09326032 A | 12/1997 |

(Continued)

OTHER PUBLICATIONS

Japanese Office Action dated Jul. 19, 2016 in corresponding Japanese Patent Application No. 2012-255338 (5 pages) (4 pages English Translation).

*Primary Examiner* — Frederick Bailey
*Assistant Examiner* — Talha M Nawaz
(74) *Attorney, Agent, or Firm* — Staas & Halsey LLP

(57) ABSTRACT

A notification control method executed by a computer, the notification control method includes: acquiring image data of a displayable image captured by an imaging device, and controlling a notification concerning detection of an object based on output of a sensor, depending on a determination of visibility for the displayable image based on the image data.

14 Claims, 14 Drawing Sheets

(56) References Cited

U.S. PATENT DOCUMENTS

| | | | |
|---|---|---|---|
| 2013/0107048 A1* | 5/2013 | Rottner | H04N 5/23238 348/148 |
| 2014/0232872 A1* | 8/2014 | Kussel | B60R 1/00 348/148 |

FOREIGN PATENT DOCUMENTS

| | | |
|---|---|---|
| JP | 2002-170200 A | 6/2002 |
| JP | 2005-135037 A | 5/2005 |
| JP | 2006-338594 | 12/2006 |
| JP | 2007-171154 | 7/2007 |
| JP | 2009-146029 A | 7/2009 |
| JP | 2012-051566 | 3/2012 |
| JP | 4889822 | 3/2012 |
| WO | WO 2010/074012 A1 | 7/2010 |

* cited by examiner

NOTIFICATION CONTROL METHOD AND NOTIFICATION CONTROL DEVICE

CROSS-REFERENCE TO RELATED APPLICATION

This application is based upon and claims the benefit of priority of the prior Japanese Patent Application No. 2012-255338, filed on Nov. 21, 2012, the entire contents of which are incorporated herein by reference.

FIELD

The embodiments discussed herein are related to a technology for controlling notification to be given to a user.

BACKGROUND

There is a technology for supporting the driver's operation of a vehicle in terms of safety by utilization of a camera mounted on the vehicle and a sensor for detecting an object existing in close proximity to the vehicle.

By way of example, there is a technology of presenting the image of the rear of a vehicle on a display. A camera called a back camera or a rear camera is attached at a position at which the camera is able to capture an image of the area located behind a vehicle. Then, the camera captures an image of the area located behind the vehicle, and the captured image is presented on a display device. The driver performs an operation such as driving and parking while confirming the image. A wide-angle camera is often adopted as the camera. The wide-angle camera enables the driver to confirm the area in a wider range than in the case of visual inspection using a rear-view mirror.

Also, there is a pedestrian recognition device that recognizes a pedestrian located in front of a vehicle using the image results captured by a visible light camera and a far-infrared camera mounted on the vehicle. Japanese Laid-open Patent Publication No. 2006-338594, for example, discloses a pedestrian recognition device. The pedestrian recognition device notifies the vehicle occupant of the presence of a pedestrian for which the recognition rate of pedestrian identification based on the image result captured by a far-infrared camera is high and for which the recognition rate of pedestrian identification by using a visible light camera is low.

Moreover, there is a technology in which a sensor capable of measuring the distance between a vehicle and an obstacle is installed in the vehicle, and the distance between the vehicle and the obstacle is sensed and indicated by a sound or an indicator lamp. For example, clearance sonar notifies the driver of the existence of an obstacle on the basis of the output of an ultrasonic sensor installed in a corner portion of the bumper.

SUMMARY

According to an aspect of the invention, a notification control method executed by a computer, the notification control method includes: acquiring image data of a displayable image captured by an imaging device, and controlling a notification concerning detection of an object based on output of a sensor, depending on a determination of visibility for the displayable image based on the image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Depending on the environment, an object to which a driver has to pay attention is sometimes not in an image, or the visibility of the object is sometimes very low for the driver. For example, objects, such as a pedestrian, a guardrail, and a curbstone, may not appear in an image that is captured while a vehicle is travelling on a dark road nor in an image that is captured while the vehicle is moving through fog. Even with the use of automatic gain control functionality that is typically included in a camera, it is difficult in many cases to satisfactorily capture an image of such objects only by adjusting exposure time.

To address such cases, for example, a far-infrared camera may be used together with a visible light camera as in the pedestrian recognition device described earlier. In this case, however, it is impossible to detect an object other than a pedestrian that does not emit infrared rays, such as a guardrail or a curbstone.

In view of the above, it is conceivable to make combined use of the display of an image captured by a camera and the notification of an obstacle detected by a sensor. For example, a driver confirms the image displayed on a display device and also separately responds to the notification of an obstacle.

The notification performed by a sensor, however, is independent of the display of an image, and therefore the notification in some cases is inconvenient for the driver. Accordingly, the present disclosure is directed to control notification of the presence of a detected object so that the notification is appropriate for a driver, when an image is displayed for supporting visual inspection by the driver.

Detailed embodiments of the present disclosure will be described below. It is to be noted that the below embodiments may be appropriately combined within the scope of not causing contradiction among contents of processing.

Figure 1:
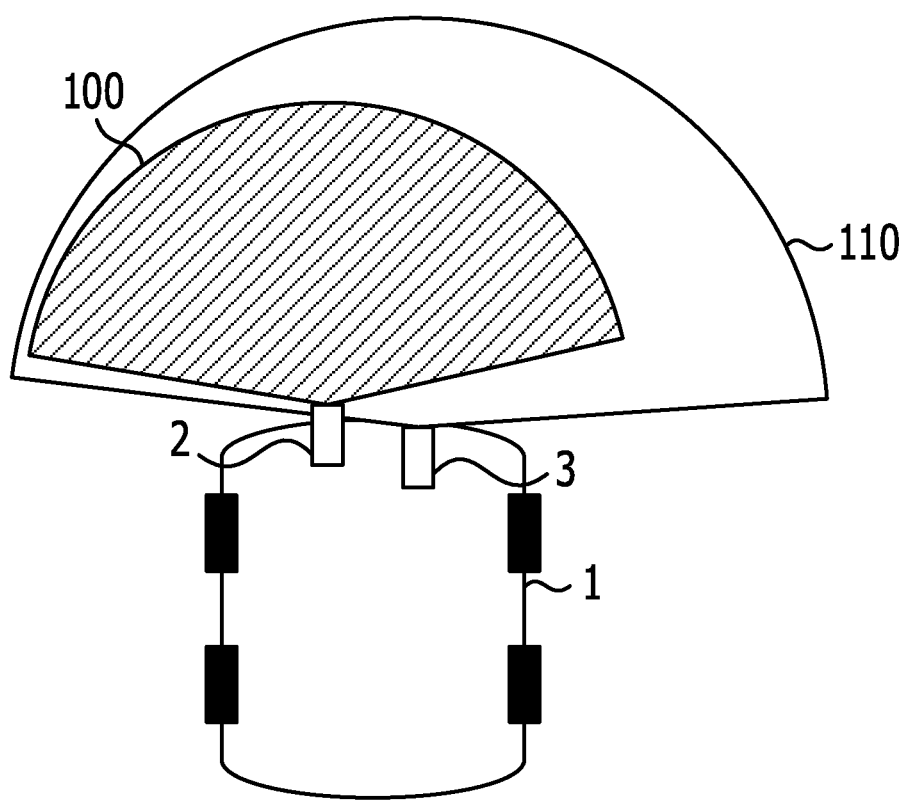
FIG. 1 illustrates an example of the relationship between the imaging range of an imaging device and the sensing range of a sensor for detecting an object.

FIG. 1 illustrates an example of the relationship between the imaging range of an imaging device and the sensing range of a sensor for detecting an object.

A vehicle 1 includes an in-vehicle camera 2 and a distance-measurement sensor 3. The in-vehicle camera 2 is an example of the imaging device. The distance-measurement sensor 3 is an example of the sensor for detecting an object.

For example, the in-vehicle camera 2 is mounted at a location where the camera 2 is able to capture an image of the area located behind a vehicle 1. Although this is for the purpose of supporting operation at the time of parking, the in-vehicle camera 2 may be mounted at a location where the camera 2 is able to capture an image in another direction. The imaging device may be a camera on a mobile phone or a smartphone other than the in-vehicle camera 2. In this case, the image captured by a camera on a mobile phone or the like is sent to a notification control device 10 described later.

The in-vehicle camera 2 is a National Television System Committee (NTSC) camera in conformity with the NTSC standards, for example. In addition, a camera or the like in conformity with other standards may be adopted as the in-vehicle camera 2.

The distance-measurement sensor 3 is mounted at a location where the distance-measurement sensor 3 is able to detect an object located behind the vehicle 1. In this embodiment, the distance-measurement sensor 3 is a millimeter wave radar. In addition, a laser radar, an ultrasonic sensor, or the like may be adopted as the distance-measurement sensor 3.

In the example of FIG. 1, an imaging range 100 of the in-vehicle camera 2 is included in a sensing range 110 of the distance-measurement sensor 3. Note that the sensing range 110 and the imaging range 100 partially overlap. In addition to the example of FIG. 1, the sensing range 110 may be included in the imaging range 100. The sensing range 110 may also be a range formed by combining together the sensing ranges of a plurality of sensors.

Hereinafter, a range in which the imaging range 100 and the sensing range 110 overlap each other is regarded as a monitored area. That is, in the example of FIG. 1, the imaging range 100 is the monitored area.

In this embodiment, notification given to a driver is controlled by utilizing the luminance information of image data acquired from the in-vehicle camera 2 and the result of detection of an object based on output from the distance-measurement sensor 3. The luminance information is information including the luminance value of each pixel of an image, and is contained in image data. Note that the image data is information on an image of the imaging range 100 including the monitored area the image of which is captured by a camera. For example, the luminance signal of an NTSC signal is used as the luminance information.

The output of the distance-measurement sensor 3 is information containing distance-measurement data. The distance-measurement data is information on the distance from an object located in the sensing range 110 to the distance-measurement sensor 3. The output from the distance-measurement sensor 3 may be the distance-measurement data of the entire sensing range 110, or may be the distance-measurement data of only the monitored area in the sensing range 110. Hereinafter, description will be given assuming that the distance from an object to the distance-measurement sensor 3 is the distance from the object to the vehicle.

Figure 2:
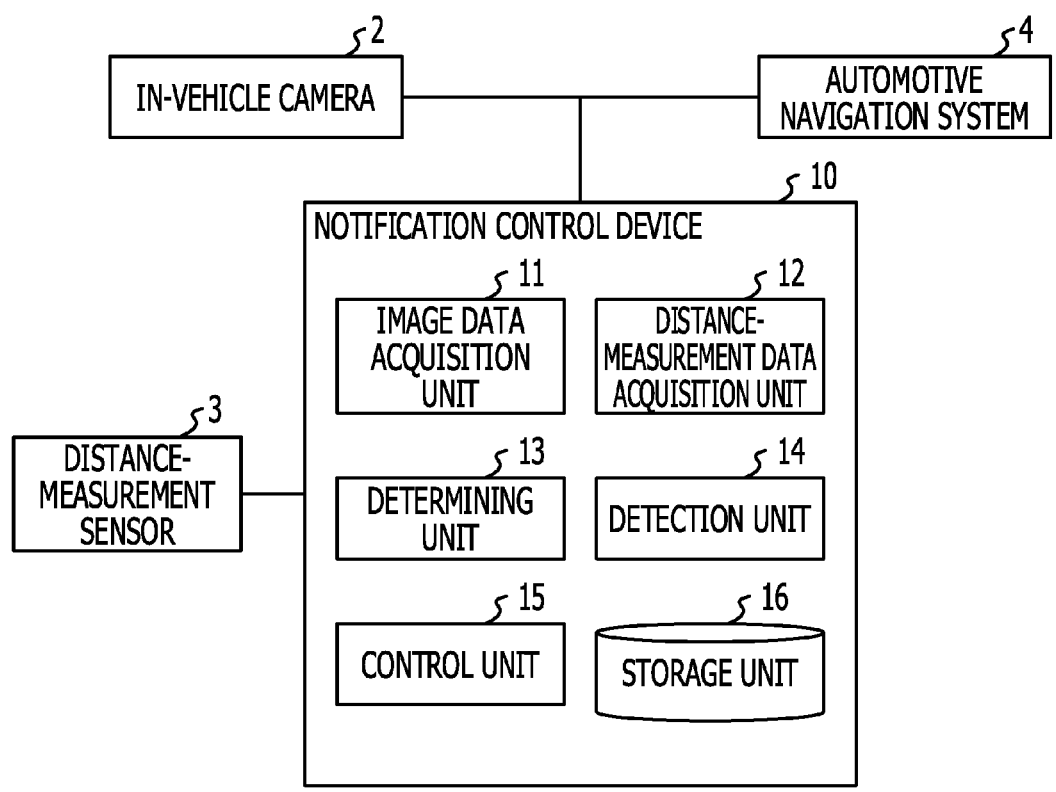
FIG. 2 is a functional block diagram of a notification control device.

With reference to FIG. 2, the functional configuration of a notification control device will be described next. FIG. 2 is a functional block diagram of a notification control device. The notification control device 10 includes an image data acquisition unit 11, a distance-measurement data acquisition unit 12, a determining unit 13, a detection unit 14, a control unit 15, and a storage unit 16.

The image data acquisition unit 11 acquires image data from the in-vehicle camera 2. Note that the in-vehicle camera 2 also outputs image data of the captured image to an automotive navigation system 4 having a display device. That is, the driver is able to confirm an object, such as an obstacle, using an image displayed on the display device, in addition to visual inspection carried out directly or by using a mirror.

The distance-measurement data acquisition unit 12 acquires distance-measurement data from the distance-measurement sensor 3. The determining unit 13 outputs a determination result, which is based on the luminance information contained in image data, to the control unit 15. Note that the visibility of an image is able to be analogically inferred from the luminance information, and therefore the determination result is information indicating whether the visibility is high or low.

For example, the determining unit 13 determines the distribution of a luminance histogram. The determining unit 13 generates a luminance histogram on the basis of luminance information. Then, the determining unit 13 calculates a dynamic range D in the luminance histogram. Additionally, the determining unit 13 determines whether the dynamic range D is greater than a threshold Td. The relationship between the dynamic range D and the visibility will be described later.

Note that the threshold Td is set in advance by analyzing the luminance histogram of an image that is perceived to be poorly visible for human beings and the luminance histogram of an image that is perceived to be highly visible. For example, when the luminance has a value in the range from 0 to 255, the threshold Td is set to 100, for example. Details of this will be described later.

Other methods using luminance information may be adopted as a way of determining by analogy whether the visibility is good or poor. For example, there are an approach of making a determination based on the ratio of the reflection component to the illumination component, an approach of making a determination based on the spatial frequency distribution, and an approach of making a determination based on the edge, the colors of the background and the foreground, and the contrast of a textural feature. These approaches are disclosed in "Visibility Enhancement Technology for In-Vehicle Cameras" by Yuushi Toyota et al. in Fujitsu magazine, vol. 59, No. 4, 2008, "Japanese Laid-open Patent Publication No. 2006-221467", and "A method for estimation of traffic sign visibility based on the integration of multiple image features" by Keisuke Doman et al. in Technical Report of the Institute of Electronics, Information and Communication Engineers (IEICE).

The detection unit 14 detects the existence of an object and outputs a detection result to the control unit 15. For example, when the distance-measurement data acquisition unit 12 acquires the distance-measurement data for the monitored area, then, the detection unit 14 detects the existence of an object if the measured distance from the vehicle to the object is included in the distance-measurement data. Note that if an object does not exist, the distance-measurement data has a specific value for indicating that an object does not exist, or the distance-measurement data is null.

In the case where the distance-measurement data of the entire sensing range 110 has been acquired, the detection unit 14 may perform each of detection of an object in the monitored area and detection of the object outside of the monitored area. A distance measurement sensor scans a sensing range in a predetermined direction. Accordingly, the position (the angle in the horizontal direction and the angle in the vertical direction) at which the distance-measurement data is captured may be identified on the basis of the ordinal number of that distance-measurement data among a group of distance-measurement data output from the distance measurement sensor.

For example, the monitored area is determined on the basis of the mounting location and the angle of view of the in-vehicle camera 2, and the mounting location and the scanning angle of the distance-measurement sensor 3. Then, depending on the monitored area, the range of distance-measurement data, from what ordinal number of distance-measurement data to what ordinal number of distance-measurement data, corresponding to the monitored area is determined in advance.

The control unit 15 controls the notification concerning an object on the basis of the determination result based on the luminance information, and the detection result. For example, if the determination result is that the dynamic range D is equal to or less than the threshold Td, and the detection result indicates that an object has been detected, the control unit 15 performs first notification control. Note that if the dynamic range D is equal to or less than the threshold Td, the target image may be estimated to be an image having poor visibility. The first notification control is to control a device for performing notification so as to perform notification.

Otherwise, if the determination result is that the dynamic range D is greater than the threshold Td, and the detection result indicates that an object has been detected, the control unit 15 performs second notification control. Note that if the dynamic range D is greater than the threshold Td, the target image may be estimated to be an image having high visibility. The second notification control controls a device for performing notification so as to perform notification different from the notification performed in the first notification control and controls the device so as not to perform notification.

Here, examples of the way of not performing notification include a method in which the control unit 15 does not generate an instruction for performing notification and a method in which the control unit 15 does not output the generated instruction for performing notification to a device for performing notification, for example.

For example, in the case where a method of indicating the existence of an object by sound is adopted as the notification method, the first notification control is control that causes the notification concerned to be performed. In contrast, the second notification control is control that does not perform the notification concerned. Note that the notification concerned is performed by using a voice output unit of the automotive navigation system 4 on the basis of an instruction from the control unit 15.

Also, in the case where a method of performing display indicating the existence of an object on a display device is adopted as the notification method, the first notification control is control that causes the notification concerned to be performed. In contrast, the second notification control is control that does not perform the notification concerned. Note that the notification concerned is performed by using a display device of the automotive navigation system 4 on the basis of an instruction from the control unit 15.

Examples of the above display include a method of displaying an alarm message on a display device, and a method of displaying an icon representative of an object detected by the distance-measurement sensor 3 in such a way that the icon is superimposed on an image captured by the in-vehicle camera 2 and displayed on the display device.

Additionally, as the notification method, a method of indication by sound and a method of display for indicating the existence of an object may be used in combination. In this case, the control unit 15 may perform control for performing the two methods as the first notification control. In contrast, the control unit 15 performs control that causes only the method of indication by sound to be performed as the second notification control. In the second notification control, it is conceivable, for example, to output a message that urges attention to an image displayed on the display device.

Also, in the case where a method of turning on a warning light provided in the vehicle is adopted as the way of notification, the first notification control is control that causes the notification concerned to be performed. In contrast, the second notification control is control that does not perform the notification concerned. In this case, the notification control device 10 has such a configuration as to be able to communicate with the warning light, which is a device for notification, and sends the warning light an instruction to turn on.

There is a possibility that the driver views the side-mirror or rearview mirror other than the display device of the automotive navigation system 4 during driving operation. When the visibility of an image captured by the in-vehicle camera 2 is poor, the visibility during visual inspection through a mirror is also anticipated to be poor. Accordingly, the control unit 15 performs control so as to cause a warning light attached to the side-mirror or the rearview mirror to turn on, so that the driver may know that an object exists.

The storage unit 16 stores various kinds of information. For example, the storage unit 16 stores information on thresholds used for various kinds of processing.

Figure 3:
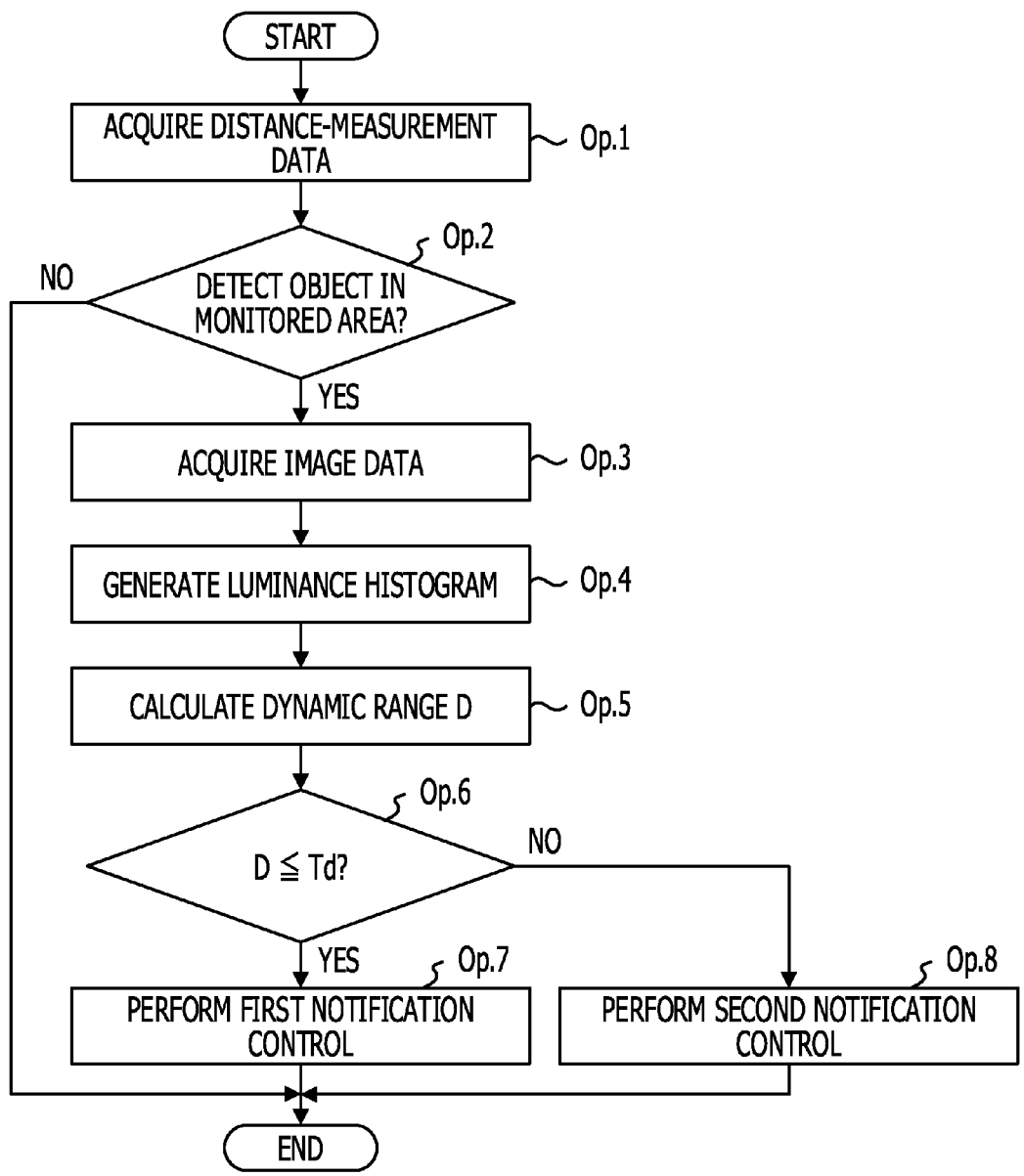
FIG. 3 is a flowchart of a notification control method according to a first embodiment.

A notification control method in this embodiment will be described next. FIG. 3 is a flowchart of the notification control method according to the first embodiment. First, the distance-measurement data acquisition unit 12 acquires distance-measurement data from the distance-measurement sensor 3 (Op. 1).

The detection unit 14 detects on the basis of distance-measurement data whether an object exists in the monitored area (Op. 2). Even with the existence of an object in the monitored area, if the object is located farther than a certain distance from the vehicle, the detection unit 14 may assume that the object does not exist.

If the detection unit 14 does not detect the object in the monitored area (No in Op. 2), the notification control device 10 terminates the process. Note that if an object is detected outside of the monitored area in the sensing range, other methods may be used for notification of the object.

Otherwise, if the detection unit 14 detects an object in the monitored area (Yes in Op. 2), the image data acquisition unit 11 acquires image data from the in-vehicle camera 2 (Op. 3). The determining unit 13 generates a luminance histogram on the basis of luminance information contained in the image data (Op. 4). Then, the determining unit 13 calculates the dynamic range D (Op. 5).

Figure 4A:
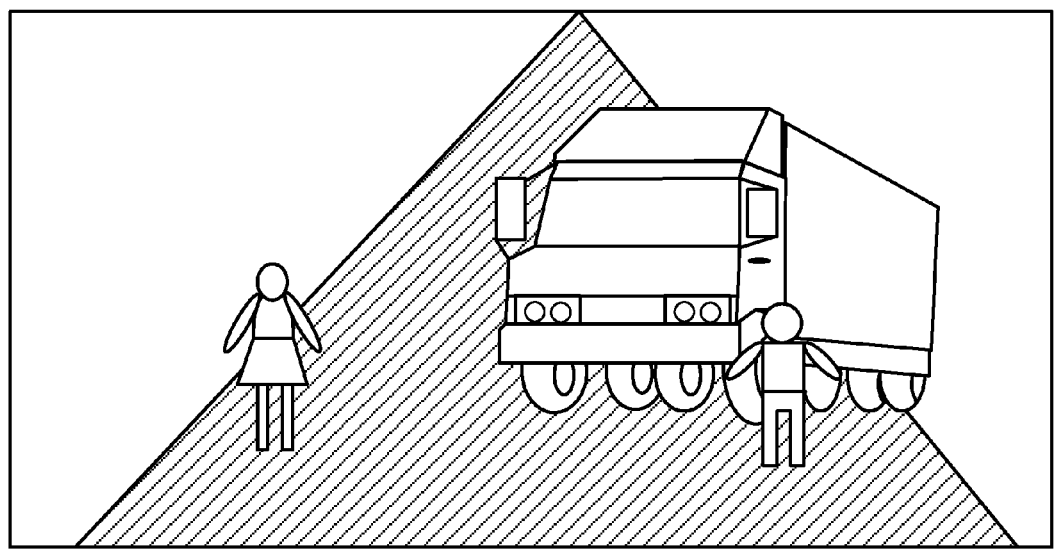
FIG. 4A and FIG. 4B are an illustration and a graph for explaining the luminance histogram and the dynamic range D.
Figure 4B:
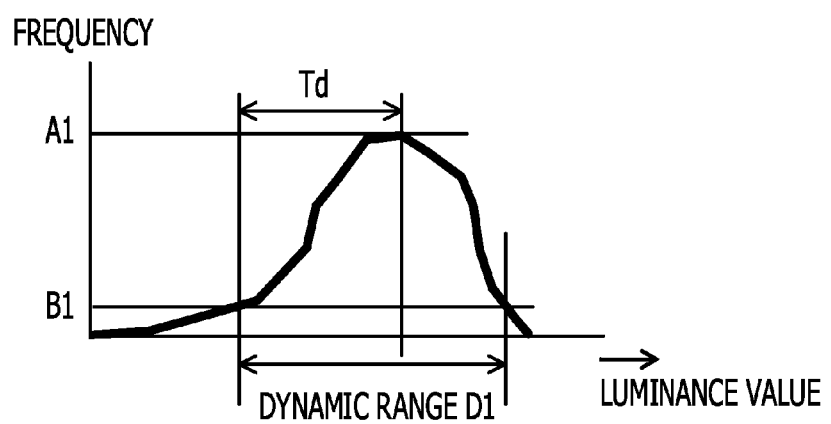

FIG. 4A and FIG. 4B are an illustration and a graph for explaining the luminance histogram and the dynamic range D. FIG. 4A is an illustration of an image captured at some point in time by the in-vehicle camera. FIG. 4B is a graph illustrating a luminance histogram corresponding to the image of FIG. 4A.

In this embodiment, as illustrated in FIG. 4B, when the highest frequency A1 in the luminance histogram is 100%, the spread of the luminance values that are equal to or greater than a frequency B1 has a width equivalent to a %. The width is regarded as a dynamic range D1. This is for the purpose of reducing the influence of noise and so forth. For example, a is 5. If a plurality of distributions of luminance values that are equal to or greater than the frequency B1 exist, the combined value may be regarded as the dynamic range D.

Then, the determining unit 13 determines whether the dynamic range D is equal to or less than the threshold Td (Op. 6). If the dynamic range D is equal to or less than the threshold Td (Yes in Op. 6), the control unit 15 performs the first notification control (Op. 7). Otherwise, if the dynamic range D is greater than the threshold Td (No in Op. 6), the control unit 15 performs the second notification control (Op. 8). In the example of FIG. 4B, since the dynamic range D1 is greater than the threshold Td, the operation of Op. 8 is performed.

As described above, the notification control device 10 may control notification on the basis of the detection result obtained by the detection unit 14 and the determination result based on the luminance information obtained by the determining unit 13.

With reference to FIG. 4A and FIG. 4B, FIG. 5A and FIG. 5B, and FIG. 6A and FIG. 6B, the effects of the first embodiment will be described here. FIG. 5A and FIG. 5B, and FIG. 6A and FIG. 6B are drawings for explaining the effects of the first embodiment.

FIG. 4A illustrates an example image captured in a bright environment. That is, the driver is able to visually recognize objects, roads, the sky, and so forth from this image. Pixels constituting the image of FIG. 4A have various luminance values to handle objects, roads, the sky, shadows, and so forth. Accordingly, as illustrated in FIG. 4B, the luminance histogram has a shape with a wide distribution. That is, in an image that may be estimated to have high visibility, the dynamic range D1 is relatively large. Typically, when scenery such as a road and the sky and objects such as a vehicle and a person exist, the dynamic range D is often 150 or more in a bright environment.

In such a manner, with the image of FIG. 4A, the driver may recognize an object from the image displayed on the display device. Therefore, in this embodiment, the necessity for notification used for announcement of the existence of an object is determined to be lower than in the case of an image described later that has poor visibility.

Figure 5A:
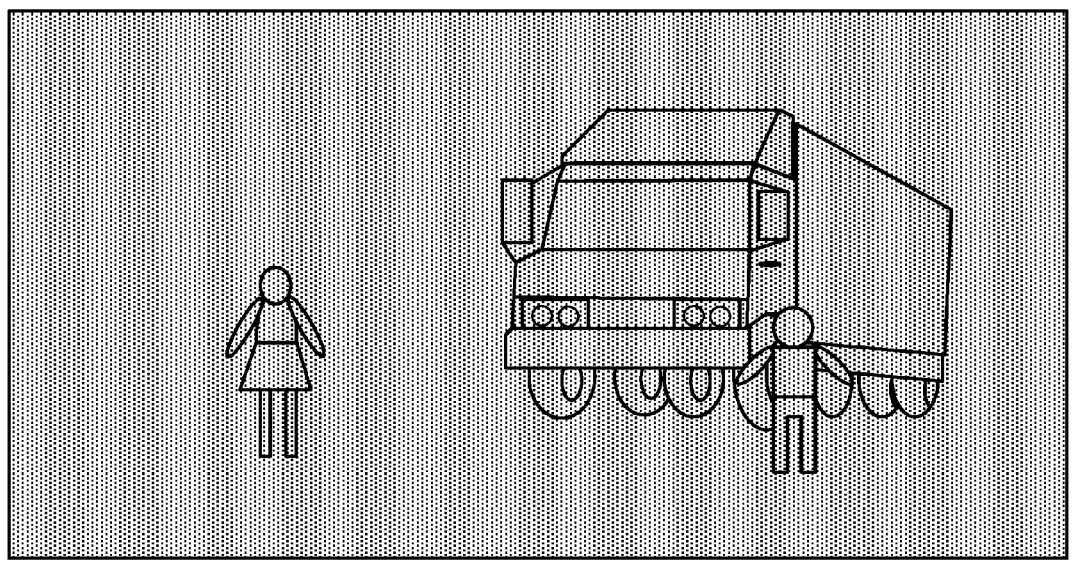
FIG. 5A and FIG. 5B are an illustration and a graph (first part) for explaining the effects of the first embodiment.

FIG. 5A illustrates an example image captured in a dark environment. An image of a dark place, such as a place without a street light, captured by a camera is dark in its entirety, and objects such as persons and vehicles are less recognizable. In the example of FIG. 5A, the woman, the truck, and so forth in the actual image are not recognizable or less recognizable in the dark.

Figure 5B:
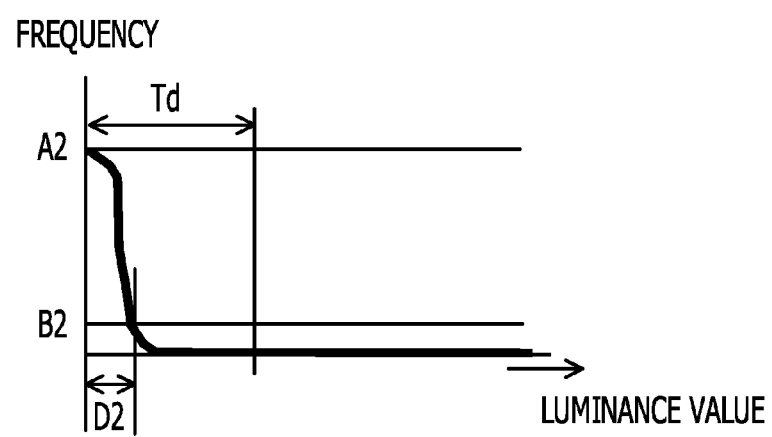

FIG. 5B illustrates the luminance histogram of the image of FIG. 5A. The luminance histogram of an image that is dark in its entirety has a shape tilted toward low luminance.

When the highest frequency A2 in the luminance histogram is 100%, the spread of the luminance values that are equal to or greater than a frequency B2 has a width equivalent to a % set in advance, that is, a dynamic range D2 is smaller than the dynamic range D1 illustrated in FIG. 4B. At this time, the dynamic range D2 is smaller than the set threshold Td. Note that, in dark images, the dynamic range D2 is about 50 in many cases, for example.

Although an image similar to the image of FIG. 5A is displayed on the display device of the automotive navigation system 4, it is difficult for the driver to confirm the existence of an object from the image displayed on the display device. Accordingly, in this embodiment, it is determined for the image of FIG. 5A that notification has to be performed in order to announce the existence of an object.

Figure 6A:
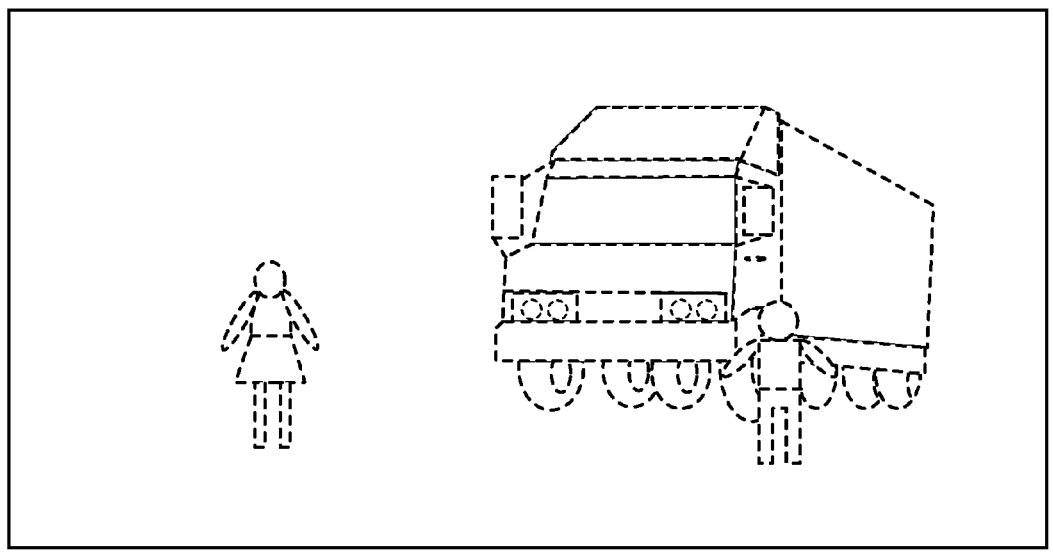
FIG. 6A and FIG. 6B are an illustration and a graph (second part) for explaining the effects of the first embodiment.

FIG. 6A illustrates an example image captured in a foggy environment. An image of a place covered with fog is white in its entirety, and objects such as persons and a vehicle are less recognizable. In the example of FIG. 6A, the entire image is whitish, and the woman, the truck, and so forth are not recognizable or less recognizable.

Figure 6B:
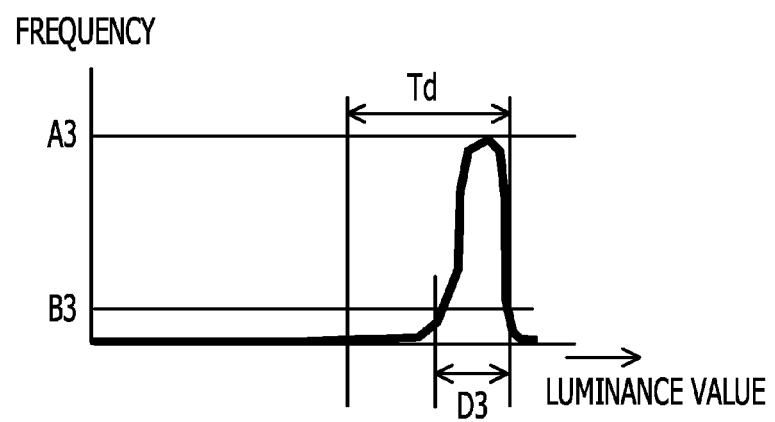

FIG. 6B illustrates the luminance histogram of the image of FIG. 6A. The luminance histogram of an image that is white in its entirety has a shape tilted toward high luminance in its entirety.

When the highest frequency A3 in the luminance histogram is 100%, the spread of the luminance values that are equal to or greater than a frequency B3 has a width equivalent to a % set in advance, that is, a dynamic range D3 is smaller than the dynamic range D1 illustrated in FIG. 4B. At this time, the dynamic range D3 is smaller than the set threshold Td. Note that, in images that are white in their entirety under the influence of fog, the dynamic range D3 is about 30 in many cases, for example.

Although an image similar to the image of FIG. 6A is displayed on the display device of the automotive navigation system 4, it is difficult for the driver to confirm the existence of an object from the image displayed on the display device. Accordingly, in this embodiment, it is determined for the image of FIG. 6A that notification has to be performed in order to announce the existence of an object.

As described above, the visibility of an image may be inferred from analogy on the basis of the dynamic range D. Accordingly, the notification control device 10 is able to perform the first notification control if there is a possibility that the driver is not able to confirm an object from an image displayed on the display device. For example, the notification control device 10 may attract attention of the driver by using sound and a display image.

In contrast, if the dynamic range D is wider than the threshold Td, high visibility is inferred from analogy. It is therefore possible for the driver to confirm an object from an image displayed on the display device. Thus, the notification control device 10 may reduce the inconvenience to the driver by suppressing unnecessary notification.

Here, when the threshold Td is set, it is desirable that the threshold Td be set to a value that enables an image as illustrated in FIG. 4A and an image as illustrated in FIG. 5A and FIG. 6A, for example, to be separated from each other. That is, the value between a dynamic range as illustrated in FIG. 4B and a dynamic range as illustrated in FIG. 5B and FIG. 6B is set as the threshold Td. The threshold Td is determined by performing statistical processing on a plurality of images. In this embodiment, the threshold Td is set to 100.

Figure 7:
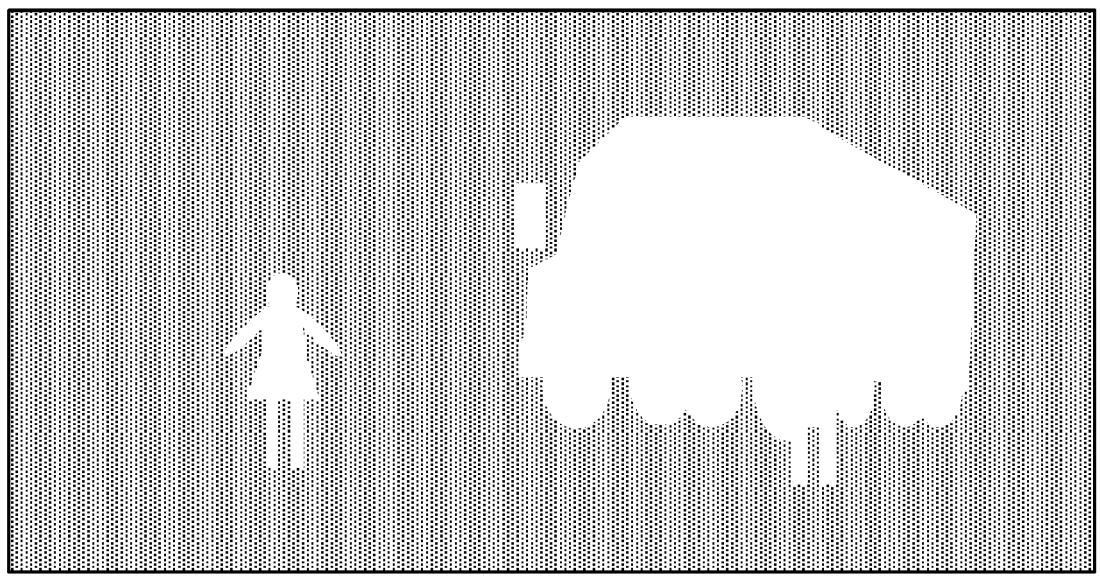
FIG. 7 is a conceptual view of an image displayed on a display device when displaying on the display device is adopted as a notification method.

FIG. 7 is a conceptual view of an image displayed on the display device when displaying on the display device is adopted as the notification method. FIG. 7 is a conceptual view of an image displayed on the display device of the automotive navigation system 4 if the control unit 15 performs the first notification control as the result of performing notification control processing on the image of FIG. 5A.

The control unit 15 identifies what ordinal number of distance-measurement data corresponds to which pixel (X, Y) of the image, on the basis of the distortion data of the in-vehicle camera 2 and the sensing range and scanning order of the distance-measurement sensor 3. That is, the control unit 15 is able to identify a region on the image corresponding to the range of the detected object.

Then, the control unit 15 instructs the automotive navigation system 4 to display an image indicating the existence area and shape of the object and an icon indicating the existence area of the object in the identified region. More particularly, the control unit 15 outputs information on the range of the corresponding region of the image and a display instruction to the automotive navigation system 4. In the image displayed on the display device, the corresponding region is displayed in a fashion different from other regions. In the example of FIG. 7, the corresponding region is displayed in such a manner as to be superimposed on the background in a fashion different from the background.

In this embodiment, the resolution of the sensor is assumed to be at the same level or greater than the resolution of the image. In this case, as illustrated in FIG. 7, the corresponding region on the image of the object will form the shape of the actual object, and an image indicating the existence region and shape of the object is drawn on the image. Note that, if the resolution of the sensor is lower than the resolution of the image, at least an icon is drawn in the existence region of the object on the image.

Note that there is a case where while the notification control device 10 is performing a series of processes, the image data of an image captured at a new time is sent from the in-vehicle camera 2 to the automotive navigation system 4. In this case, an icon may be displayed on the latest image in the corresponding region identified in the notification control method for the previous image. There is a low possibility that the environment will change rapidly in a short time of several frames. Therefore, even if an icon is displayed on an image different from the image being processed, the desired attention of the driver is attracted.

Figure 8:
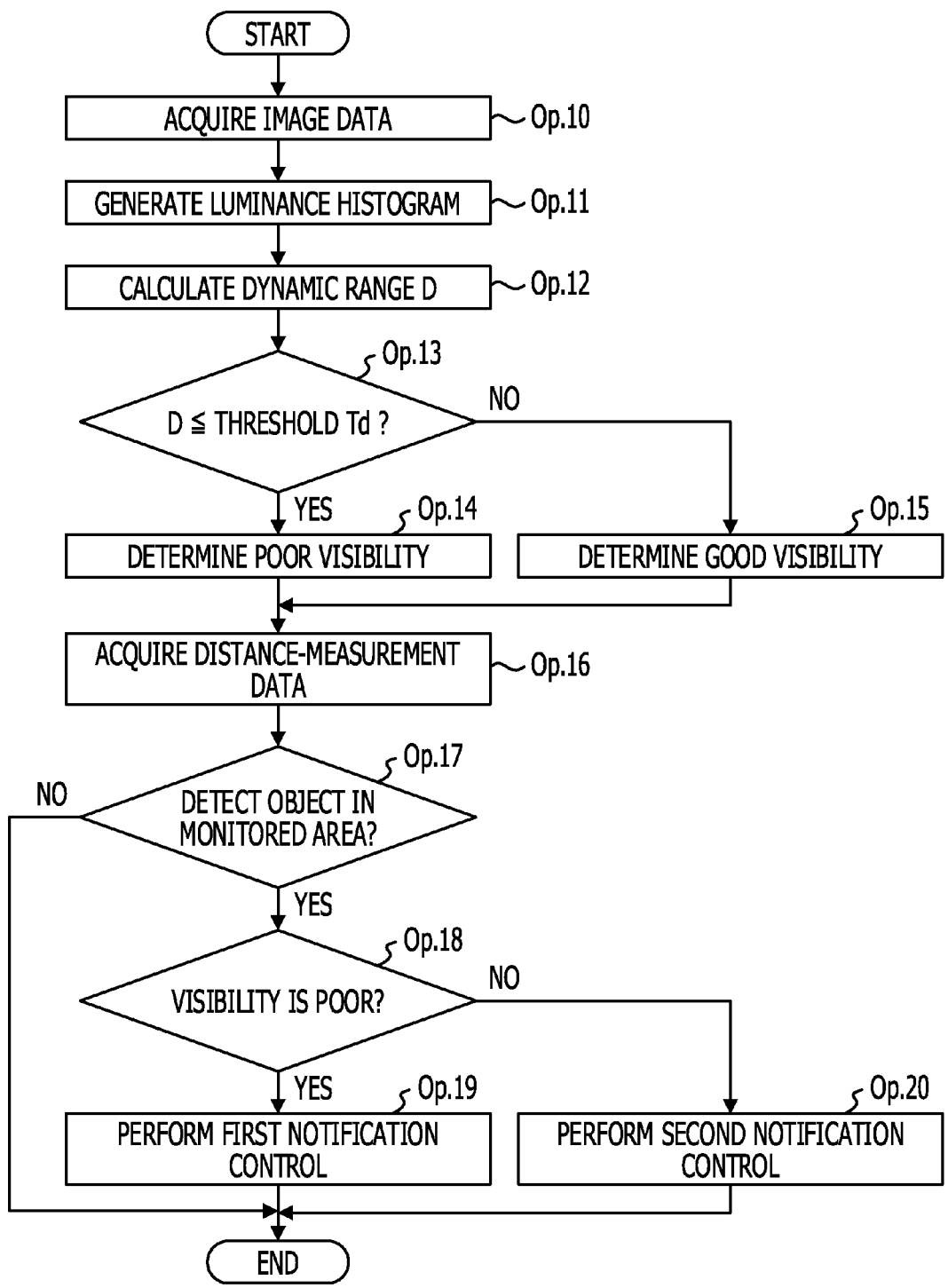
FIG. 8 is a flowchart of a notification control method according to a second embodiment.

A second embodiment will be described from here. FIG. 8 is a flowchart of a notification control method according to the second embodiment. In the notification control method of the first embodiment illustrated in FIG. 3, processing of determining the visibility of an image is performed if an object is detected. In contrast, in the notification control method according to the second embodiment illustrated in FIG. 8, an object is detected after the visibility of an image is determined. Note that a notification control device that performs the notification control method according to the second embodiment has the same configuration as the notification control device 10 illustrated in FIG. 2.

The Image data acquisition unit 11 acquires image data from the in-vehicle camera 2 (Op. 10). The determining unit 13 generates a luminance histogram on the basis of luminance information contained in the image data (Op. 11). Then, the determining unit 13 calculates the dynamic range D (Op. 12).

Then, the determining unit 13 determines whether the dynamic range D is equal to or less than the threshold Td (Op. 13). If the dynamic range D is equal to or less than the threshold Td (Yes in Op. 13), the determining unit 13 determines that the image being processed has poor visibility (Op. 14). Otherwise, if the dynamic range D is greater than the threshold Td (No in Op. 13), the determining unit 13 determines that the image being processed has high visibility (Op. 15).

Then, the distance-measurement data acquisition unit 12 acquires distance-measurement data from the distance measurement sensor 3 (Op. 16). On the basis of the distance-measurement data, the detection unit 14 detects whether an object exists in the monitored area (Op. 17). If the detection unit 14 does not detect an object in the monitored area (No in Op. 17), the notification control device 10 terminates the process. Otherwise, if the detection unit 14 detects an object in the monitored area (Yes in Op. 17), the control unit 15 determine whether the result of determination of visibility indicates that the visibility is poor (Op. 18).

If the result of determination indicates that visibility is poor (Yes in Op. 18), the control unit 15 performs the first notification control (Op. 19). Otherwise, if the result of determination indicates that the visibility is good (No in Op. 18), the control unit 15 performs the second notification control (Op. 20).

As described above, in the second embodiment, the visibility is able to be determined before. Although the first embodiment has a smaller computational complexity of the entire processing as compared with the second embodiment, the notification control method of the second embodiment may be performed.

Figure 9:
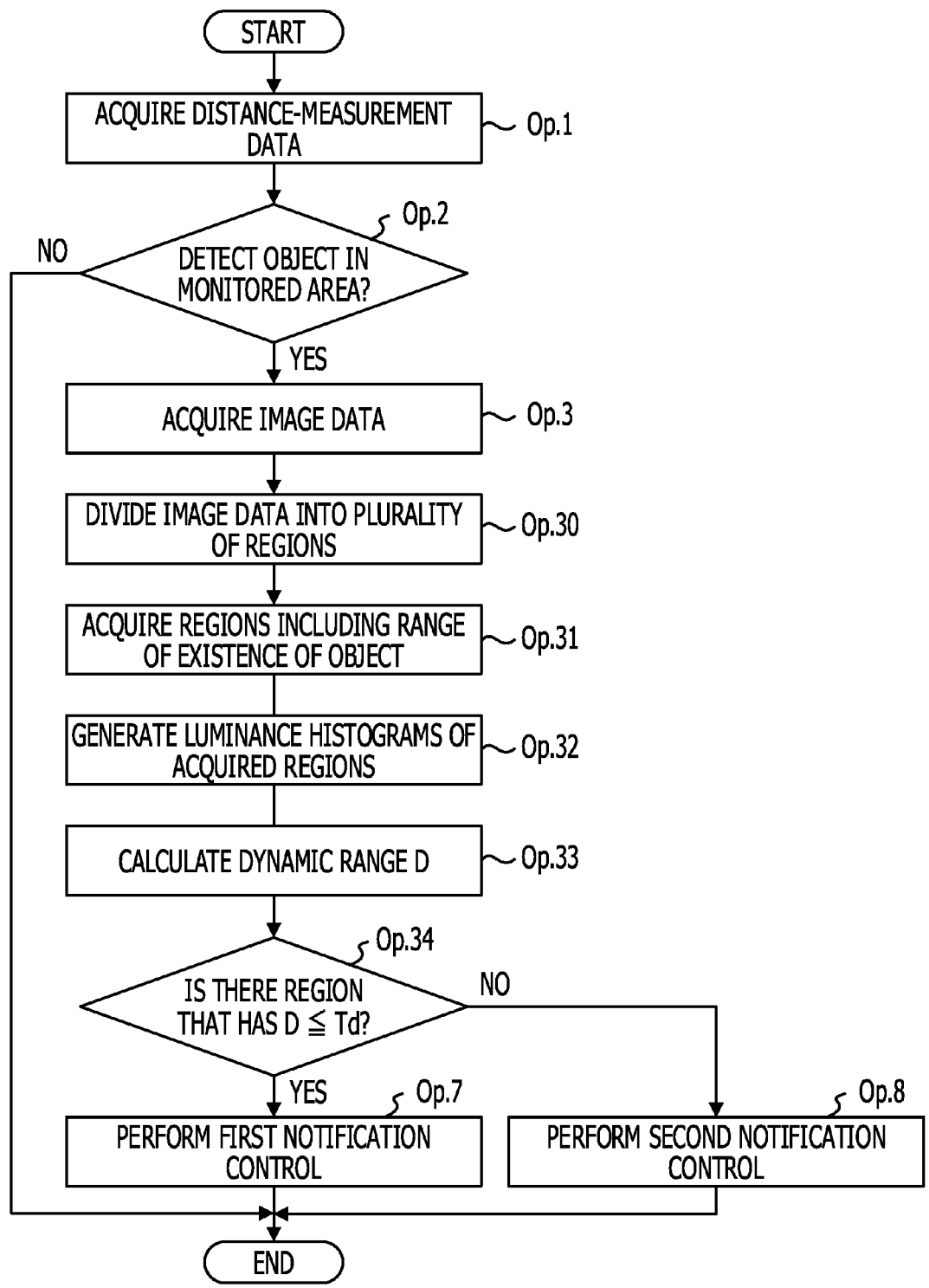
FIG. 9 is a flowchart of a notification control method in a third embodiment.

A notification control method in a third embodiment will be described next. FIG. 9 is a flowchart of the notification control method in the third embodiment. In the third embodiment, an image is divided into a plurality of regions. Then, in the third embodiment, notification is controlled on the basis of the luminance information for each region and the object detection result. Note that the notification control device that performs the notification control method according to the third embodiment is the notification control device 10 illustrated in FIG. 2.

Op. 1, Op. 2, Op. 3, Op. 7, and Op. 8 in FIG. 9 are the same as Op. 1, Op. 2, Op. 3, Op. 7, and Op. 8 in FIG. 3.

The distance-measurement data acquisition unit 12 acquires distance-measurement data from the distance measurement sensor 3 (Op. 1). The detection unit 14 detects on the basis of the distance-measurement data whether an object exists in a monitored area (Op. 2). If the detection unit 14 does not detect an object in the monitored area (No in Op. 2), the notification control device 10 terminates the process.

Otherwise, if the detection unit 14 detects an object in the monitored area (Yes in Op. 2), the detection unit 14 outputs information on the range of existence of the object to the determining unit 13. For example, the detection unit 14 identifies the information on the range of existence on the image corresponding to the range of existence of the object, on the basis of the order of output of the distance measurement sensor 3, the distortion data, and the like.

Then, the image data acquisition unit 11 acquires image data from the in-vehicle camera 2 (Op. 3). The determining unit 13 divides the acquired image data into a plurality of regions (Op. 30). For example, the data is divided into regions 4 long×10 wide. Then, the determining unit 13 acquires one or more regions including the range of existence of the object among the plurality of regions using the information on the range of existence of the object (Op. 31).

Then, the determining unit 13 generates the luminance histogram of each of the regions acquired in Op. 31, on the basis of the luminance information contained in the image data (Op. 32). The determining unit 13 then calculates the dynamic range D for each luminance histogram (Op. 33).

Then, the determining unit 13 determines whether there is a region in which the dynamic range D is equal to or less than the threshold Td (Op. 34). If there is a region in which the dynamic range D is equal to or less than the threshold Td (Yes in Op. 34), the control unit 15 performs the first notification control (Op. 7). Otherwise, if there is no region in which the dynamic range D is equal to or less than the threshold Td (No in Op. 34), the control unit 15 performs the second notification control (Op. 8).

Figure 10A:
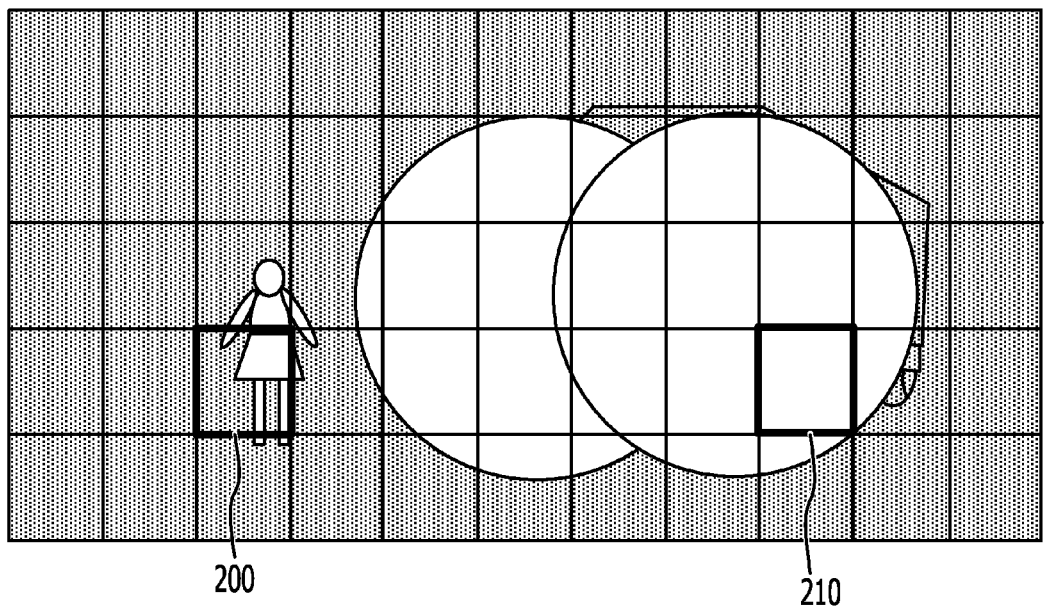
FIG. 10A, FIG. 10B, and FIG. 10C are an illustration and graphs for explaining the effects of the third embodiment.
Figure 10B:
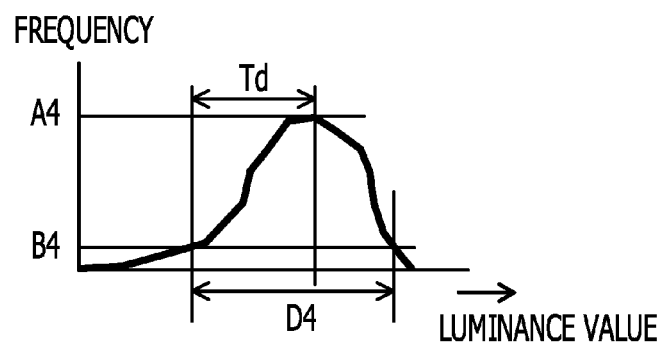
Figure 10C:
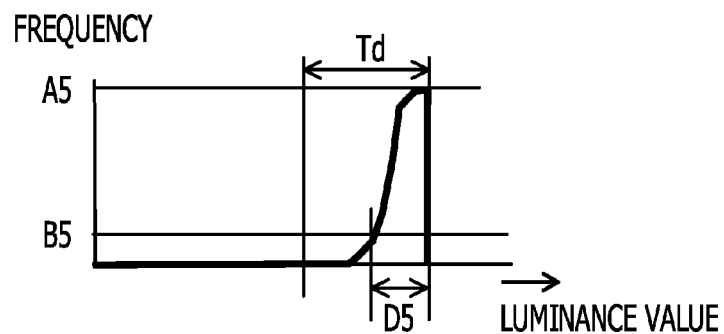

FIG. 10A, FIG. 10B, and FIG. 10C are an illustration and graphs for explaining the effects of the third embodiment. FIG. 10A is a conceptual view of an image in which a region where light of another vehicle is incident upon an object and therefore the visibility of the object is high and a region where the visibility is low because of phenomena, such as a flare, a ghost, and a smear, caused by light of another vehicle exist in a mixed manner. Note that the grid of FIG. 10A indicates divided regions.

FIG. 10B is a graph illustrating the luminance histogram of a region 200. For a region where an object exists and upon which light is incident as in the region 200, the luminance histogram is distributed over a wide range from high luminance to low luminance. Accordingly, a dynamic range D4 is large in a region where light is incident on an object, that is, a region where the visibility is high. That is, the dynamic range D4 is greater than the threshold Td.

In contrast, FIG. 10C is a graph illustrating the luminance histogram of a region 210. For a region where so-called blown out highlights occur as in the region 210, the values are concentrated toward high luminance in the luminance histogram. Accordingly, the dynamic range D5 is small for the region where blown out highlights occur under the influence of excessively strong light, that is, the region where the visibility is low. The dynamic range D5 is equal to or less than the threshold Td.

Even with the existence of an object, if the existence region of the object is a region where the visibility is high, unnecessary notification is troublesome for the driver. On the other hand, if the region where an object exists is a region where the visibility is low, it is difficult for the driver to confirm the existence of the object. The driver is therefore to be notified of the existence of the object.

Thus, controlling notification depending on the range of existence of an object and the visibility on the image corresponding to the range of existence of the object is desired for the driver. In the case of FIG. 10A, the region 210 that is the range of existence of an object and where the visibility is low is included, and therefore the notification control device 10 may notify the driver of the existence of an object that is less likely to be confirmed from the image.

As described above, the notification control device 10 in the third embodiment may perform suitable notification control for an image in which a region where visibility is high and a region where visibility is low exist in a mixed manner. Note that, in the third embodiment as in the second embodiment, the processing of determining the visibility may be performed prior to the detection of an object.

A fourth embodiment will be described next. In the fourth embodiment, a notification control device controls notification on the basis of the vehicle speed in addition to the detection result and the luminance information.

Figure 11:
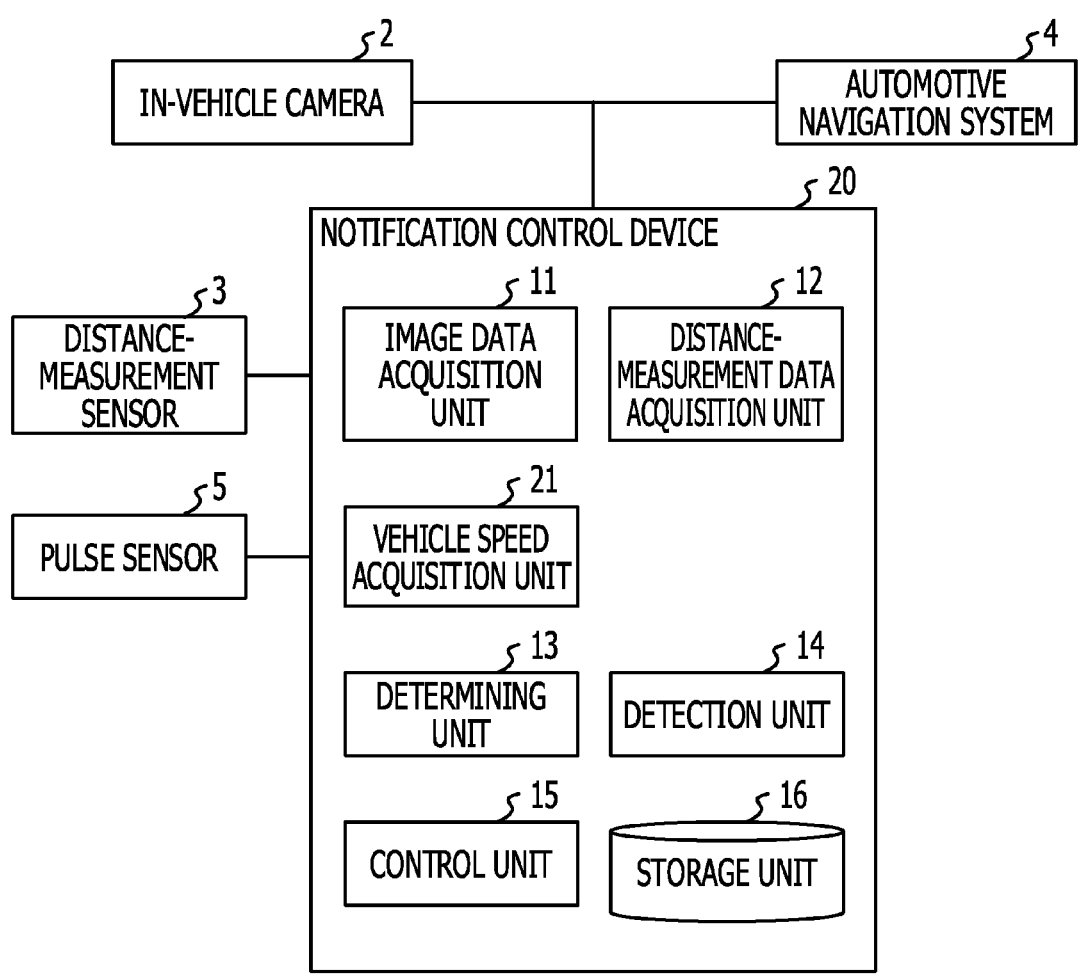
FIG. 11 is a functional block diagram of a notification control device according to a fourth embodiment.

FIG. 11 is a functional block diagram of a notification control device according to the fourth embodiment. A notification control device 20 includes a vehicle speed acquisition unit 21, in addition to the image data acquisition unit 11, the distance-measurement data acquisition unit 12, the determining unit 13, the detection unit 14, the control unit 15, and the storage unit 16. Note that the image data acquisition unit 11, the distance-measurement data acquisition unit 12, the determining unit 13, and the detection unit 14 are processing units having the same functions as the notification control device 10 illustrated in FIG. 2.

The vehicle speed acquisition unit 21 acquires the vehicle speed data for the vehicle speed from the pulse sensor 5. The pulse sensor 5 outputs some pulses each time the wheel rotates. The vehicle speed acquisition unit 21 acquires the vehicle speed on the basis of the number of times of output of pulses per unit time from the pulse sensor 5. Note that the vehicle speed acquisition unit 21 may acquire the vehicle speed data flowing over a controlled area network (CAN) in the vehicle.

The control unit 15 controls notification on the basis of the vehicle speed in addition to the result of detection of an object and the information on luminance of an image. For example, if an object has been detected and it is inferred from analogy that the visibility of an image is good, different types of notification control are performed depending on the vehicle speed.

For example, it is known from the analysis result of a driver's operation that there is a high possibility that a driver does not view the display device when the vehicle speed is equal to or greater than a certain speed. Accordingly, even if it is inferred from analogy that the visibility of an image displayed on a display device is good, there is a possibility that the driver does not confirm the image. The control unit 15 therefore gives instructions for attracting the attention of the driver to the image, for example, through a device that carries out notification.

Figure 12:
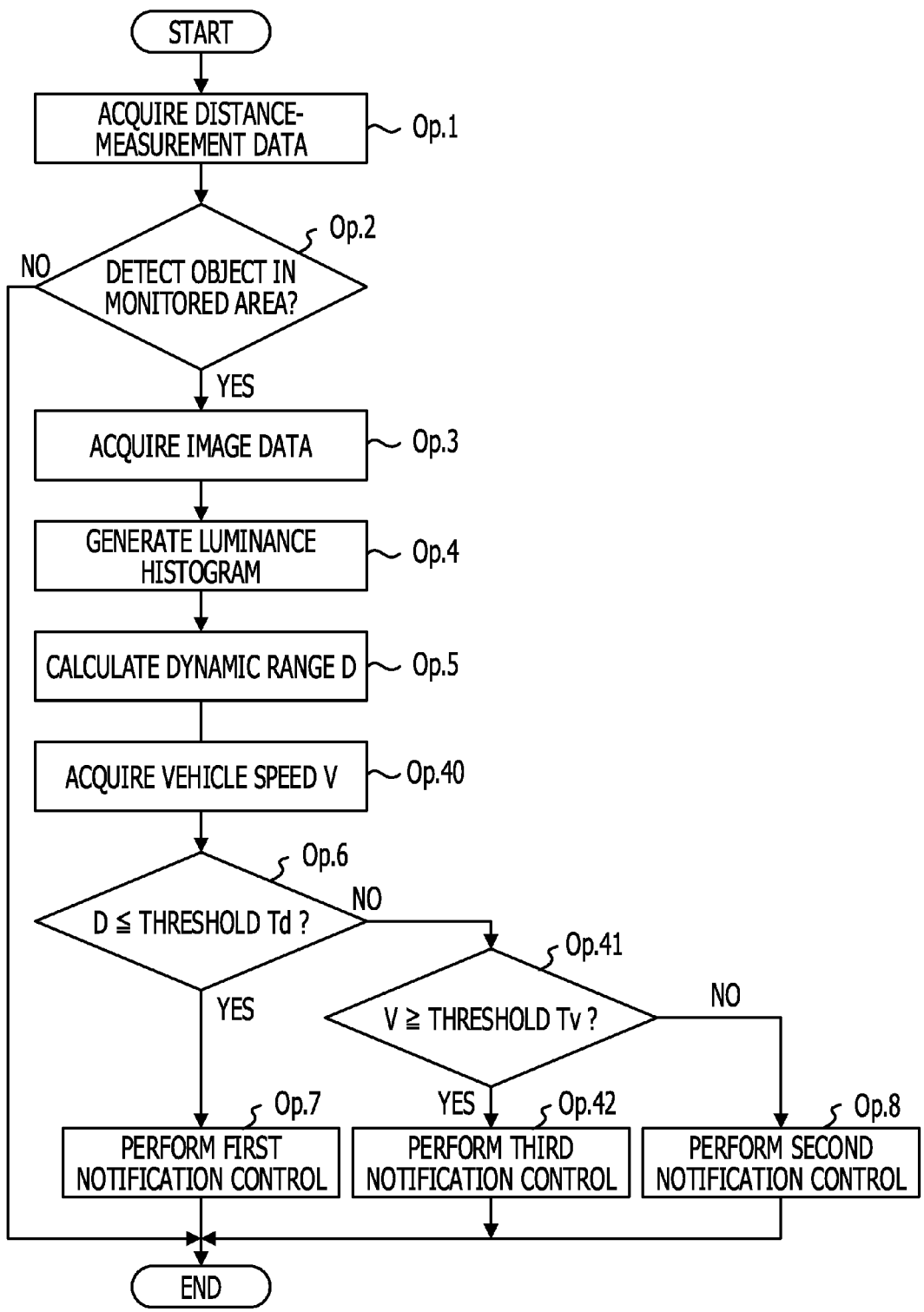
FIG. 12 is a flowchart of a notification control method in the fourth embodiment.

FIG. 12 is a flowchart of a notification control method in the fourth embodiment. Op. 1, Op. 2, Op. 3, Op. 4, Op. 5, Op. 6, Op. 7, and Op. 8 in FIG. 12 are the same as Op. 1, Op. 2, Op. 3, Op. 4, Op. 5, Op. 6, Op. 7, and Op. 8 in FIG. 3. The distance-measurement data acquisition unit 12 acquires distance-measurement data from the distance measurement sensor 3 (Op. 1). The detection unit 14 detects on the basis of the distance-measurement data whether an object exists in the monitored area (Op. 2).

If the detection unit 14 does not detect an object in the monitored area (No in Op. 2), the notification control device 10 terminates the process. Otherwise, if the detection unit 14 detects an object in the monitored area (Yes in Op. 2), the image data acquisition unit 11 acquires image data from the in-vehicle camera 2 (Op. 3).

The determining unit 13 generates a luminance histogram on the basis of luminance information contained in the image data (Op. 4). Then, the determining unit 13 calculates the dynamic range D (Op. 5). The vehicle speed acquisition unit 21 acquires a vehicle speed V next (Op. 40). Note that the acquired vehicle speed V is output to the control unit 15.

Then, the determining unit 13 determines whether the dynamic range D is equal to or less than the threshold Td (Op. 6). If the dynamic range D is equal to or less than the threshold Td (Yes in Op. 6), the control unit 15 performs the first notification control (Op. 7).

Otherwise, if the dynamic range D is greater than the threshold Td (No in Op. 6), the control unit 15 determines whether the vehicle speed V is equal to or greater than a threshold Tv (Op. 41). Note that the threshold Tv is set in advance in accordance with the scene to which this embodiment is applied. For example, when this embodiment is applied to the case where the vehicle is parked, the vehicle is typically predicted to be operated at a low speed. Accordingly, the predicted value of the speed at which the driver is able to turn his or her eyes upon the display device, among low speeds, is set as the threshold Tv. For example, the threshold Tv is set to 4 km/h.

If the vehicle speed V is equal to or greater than the threshold Tv (Yes in Op. 41), the control unit 15 performs third notification control (Op. 42). For example, the control unit 15 instructs the automotive navigation system 4 to output sound for instructing the driver to view the display device, as the third notification control. Alternatively, the control unit 15 instructs the automotive navigation system 4 to output sound for instructing the driver to decrease the speed, as the third notification control. Otherwise, if the vehicle speed V is less than the threshold Tv (No in Op. 41), the control unit 15 performs the second notification control (Op. 8).

As described above, when an object is detected, the eyes of the driver are inferred from analogy on the basis of not only the visibility of an image but also the vehicle speed, and the notification control device 20 controls suitable notification. For example, when it is inferred from analogy that the driver does not view an image that has high visibility even if the image is displayed on the display device, the notification control device 20 may attract the attention of the driver so as to turn his or her eyes to the displayed image.

A fifth embodiment will be described next. In the fifth embodiment, a notification control device controls notification on the basis of the collision time between the object and the vehicle in addition to the detection result and the luminance information. Note that the notification control device according to the fifth embodiment has the same functional configuration as the notification control device 10 illustrated in FIG. 2.

When detecting an object, the detection unit 14 calculates the predicted period of time of arrival that will be taken until the object and the vehicle collide with each other (hereinafter, referred to as a "collision time") on the basis of the changes of the distance between the detected object and the vehicle. Note that the calculated collision time is output to the control unit 15. The control unit 15 controls notification on the basis of the collision time between the object and the vehicle in addition to the detection result and the luminance information.

Figure 13:
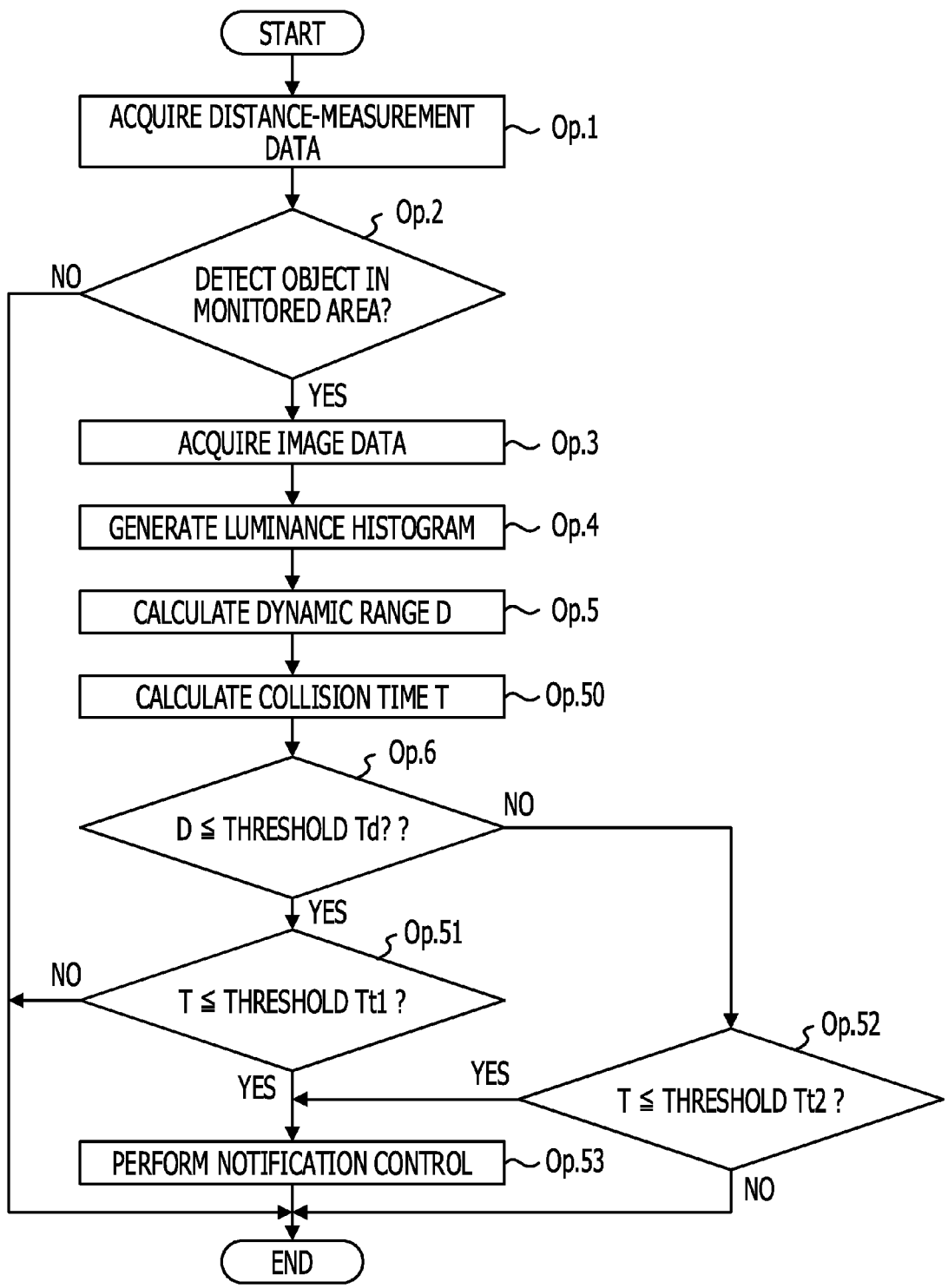
FIG. 13 is a flowchart of a notification control method in a fifth embodiment.

FIG. 13 is a flowchart of a notification control method in the fifth embodiment. Op. 1, Op. 2, Op. 3, Op. 4, Op. 5, and Op. 6 in FIG. 13 are the same as Op. 1, Op. 2, Op. 3, Op. 4, Op. 5, and Op. 6 in FIG. 3.

First, the distance-measurement data acquisition unit 12 acquires distance-measurement data from the distance measurement sensor 3 (Op. 1). The detection unit 14 detects on the basis of the distance-measurement data whether an object exists in the monitored area (Op. 2).

If the detection unit 14 does not detect an object in the monitored area (No in Op. 2), the notification control device 10 terminates the process. Otherwise, if the detection unit 14 detects an object in the monitored area (Yes in Op. 2), the image data acquisition unit 11 acquires image data from the in-vehicle camera 2 (Op. 3).

The determining unit 13 generates a luminance histogram on the basis of luminance information contained in the image data (Op. 4). Then, the determining unit 13 calculates the dynamic range D (Op. 5). Then, the detection unit 14 calculates a collision time T (Op. 50). The storage unit 16 temporarily stores the distance-measurement data acquired at the immediately previous time point. Then, the detection unit 14 calculates the collision time T from a change in the distance based on the distance-measurement data newly acquired and the distance-measurement data acquired at the immediately previous time point.

Then, the determining unit 13 determines whether the dynamic range D is equal to or less than the threshold Td (Op. 6). If the dynamic range D is equal to or less than the threshold Td (Yes in Op. 6), the control unit 15 determines whether the collision time T is equal to or less than a threshold Tt1 (Op. 51).

If the collision time T is equal to or less than the threshold Tt1 (Yes in Op. 51), the control unit 15 performs notification control (Op. 53). The notification control in the fifth embodiment may be equivalent to the first notification control in other embodiments. For example, the control unit 15 instructs the sound output unit of the automotive navigation system 4 to attract the attention by sound. Otherwise, if the collision time T is greater than the threshold Tt1 (No in Op. 51), the control unit 15 terminates the process.

If the dynamic range D is greater than the threshold Td (No in Op. 6), the control unit 15 determines whether the collision time T is equal to or less than a threshold Tt2 (Op. 52). If the collision time T is equal to or less than the threshold Tt2 (Yes in Op. 52), the control unit 15 performs notification control (Op. 53). Otherwise, if the collision time T is greater than the threshold Tt2 (No in Op. 52), the control unit 15 terminates the process.

That is, if it is inferred from analogy that the visibility is poor, the control unit 15 causes notification to be performed when the collision time T becomes equal to or less than the threshold Tt1. Also, even if it is inferred from analogy that the visibility is good, the control unit 15 causes notification to be performed when the collision time T becomes equal to or less than the threshold Tt2, because the distance between the vehicle and the object is short.

As described above, the timing at which notification is performed may be controlled depending on whether the visibility is good or poor. Here, it is desirable that the threshold Tt1 be greater than the threshold Tt2. In the case where it is difficult to visually recognize an object from an image, that is, it is desired to attract the attention of the driver earlier, notification is performed at an earlier timing.

Figure 14:
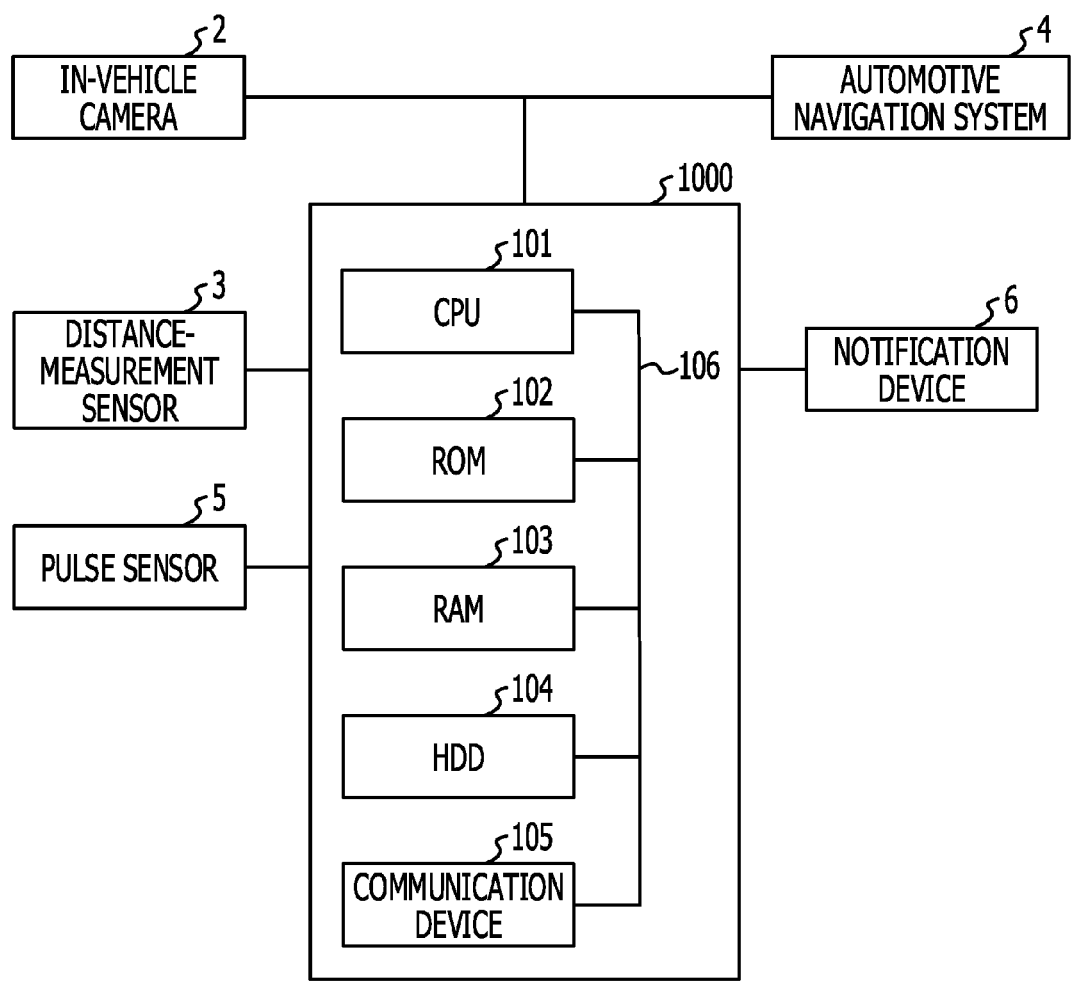
FIG. 14 illustrates an example hardware configuration of a computer that functions as the notification control device.

FIG. 14 illustrates an example hardware configuration of a computer 1000 that functions as the notification control device 10 or the notification control device 20. The computer 1000 is connected to the in-vehicle camera 2, the distance-measurement sensor 3, the automotive navigation system 4, and the pulse sensor 5. Additionally, depending on a notification method, a notification device 6 other than the automotive navigation system 4 may further be connected. The notification device 6 is a warning light, for example.

The computer 1000 includes a central processing unit (CPU) 101, a read only memory (ROM) 102, a random access memory (RAM) 103, a hard disk drive (HDD) 104, and a communication device 105. Note that the computer 1000 may further include an input device, a display device, and a medium reading device. The elements are mutually connected through a bus 106. Accordingly, the elements may mutually transmit and receive data under the management performed by the CPU 101.

A program in which the notification control method is described is recorded on a recording medium that is readable by the computer 1000. Examples of the recording medium that is readable by the computer 1000 include a magnetic recording medium, an optical disc, a magneto-optical medium, and a semiconductor memory. Examples of the magnetic recording medium include a hard disk drive (HDD), a flexible disk (FD), and a magnetic tape (MT).

Examples of the optical disc include a digital versatile disc (DVD), a DVD-RAM, a compact disc-read only memory (CD-ROM), and a CD-recordable (R)/rewritable (RW). Examples of the magneto-optical medium include a magneto-optical (MO) disk. In cases where this program is circulated, it is conceivable that a portable-type recording medium, such as a DVD or a CD-ROM, on which the program is recorded is sold, for example.

Then, a medium reader, for example, reads the program from the recording medium on which the notification control program is recorded. The CPU 101 stores the read program in the HDD 104. Additionally, various programs may be stored in the ROM 102 and the RAM 103 that are accessible to the CPU 101.

The CPU 101 is a central processing unit that manages control over operation of the entire computer 1000. The CPU 101 reads various programs from the HDD 104 and executes them, so that the CPU 101 functions as the image data acquisition unit 11, the distance-measurement data acquisition unit 12, the determining unit 13, the detection unit 14, the control unit 15, and the vehicle speed acquisition unit 21. That is, the computer 1000 functions as the notification control device 10 or the notification control device 20.

Additionally, the HDD 104 functions as the storage unit 16 under management of the CPU 101. The information in the storage unit 16 may be stored in the ROM 102 and the RAM 103, which are accessible to the CPU 101, as is the case of the programs. The RAM 103 also stores information temporarily generated in the process of processing. The communication device 105 provides information to, and from, other devices connected through an interface to the communication device 105. That is, the communication device 105 may function as the image data acquisition unit 11, the distance-measurement data acquisition unit 12, and the vehicle speed acquisition unit 21.

[First Modification]

In the case where the fourth embodiment and the fifth embodiment are combined together, the notification control device 20 may control the timing of notification on the basis of the collision time T and the vehicle speed V.

For example, in the case where the vehicle speed V is equal to or less than the threshold Tv, another device is caused to perform notification at a timing at which the collision time reaches Tt1 if the visibility is poor. In the case where the vehicle speed V is equal to or less than the threshold Tv, in contrast, another device is caused to perform notification at a timing at which the collision time reaches Tt2 if the visibility is good.

Additionally, if the vehicle speed V is greater than the threshold Tv, another device for performing notification is controlled at a timing at which the collision time T reaches the threshold Tt3.

For example, each threshold is set so that the threshold Tt2<the threshold Tt3<the threshold Tt1. If the vehicle speed is greater than the threshold Tv, the braking distance at the time of stopping will become long. Therefore, the notification control device 20 performs notification at a timing earlier than the threshold Tt2 regardless of whether image visibility is good or poor. Otherwise, if the vehicle speed is less than the threshold Tv, notification is performed at an appropriate timing depending on whether the visibility is good or poor, as in the fifth embodiment.

[Second Modification]

An object recognition technique may be further installed in the notification control device 10 or the notification control device 20. In this case, it is possible to separately determine that the detected object is a person or a vehicle. Accordingly, the notification control device 10 or the notification control device 20 may separate notification control methods depending on the kinds of the detected objects.

[Third Modification]

In the case where the visibility is determined using a luminance histogram, the notification control device 20 may further identify the scene to which an image is related, on the basis of the distributed luminance values of the luminance histogram. Then, the notification control device 20 may control the notification depending on the scene.

For example, as in the case of FIG. 5A and FIG. 5B, if the dynamic range D of the luminance histogram is less than the threshold Td and the distribution inclines toward low luminance, the image is an image in a dark environment and therefore the notification control device 20 performs control so that notification suitable for a dark environment is performed. In contrast, as in the case of FIG. 6A and FIG. 6B, if the dynamic range D of the luminance histogram is less than the threshold Td and the distribution inclines toward high luminance, the image is an image in a foggy environment and therefore the notification control device 20 performs control so that notification suitable for the foggy environment is performed.

[Fourth Modification]

In the fifth embodiment, the notification control device 10 may control notification on the basis of the distance between an object and the vehicle being processed, instead of the collision time. That is, the notification control device 10 performs various kinds of control if the distance becomes equal to or less than a threshold.

[Fifth Modification]

The first to third embodiments may be applied to cases other than the notification for supporting the operation of a vehicle. For example, in a monitoring system and the like, a notification method of a sensor for detecting a suspicious object may be controlled depending on the visibility of an image captured by a surveillance camera.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A notification control method executed by a computer, the notification control method comprising:
acquiring image data of a displayable image from an imaging device which captures a capturing area,
acquiring sensing data from an object detection sensor which detects an object within measuring area overlapping the capturing area;
determining a visibility for the displayable image by
generating a luminance histogram based on luminance information of the image data, and
calculating a dynamic range in the luminance histogram to determine the visibility for the displayable image; and
controlling a notification by a device to notify a detection of the object by the object detection sensor, in response to the dynamic range for the determined visibility for the displayable image being equal to or less than a threshold.

2. The notification control method according to claim 1, wherein the determining the visibility for the displayable image comprises:
dividing the image data into a plurality of regions, and determining the visibility for the displayable image for the plurality of regions.

3. The notification control method according to claim 2, wherein:
at least one region, from among the plurality of regions, is identified as corresponding to a range where the object has been detected based on the sensing data from the object detection sensor, and determining the visibility of the displayable image is determined based on luminance information of the at least one identified region.

4. The notification control method according to claim 1, wherein the imaging device is an in-vehicle camera mounted on a vehicle, the notification control method further comprises acquiring a speed of the vehicle, and the controlling controls the notification based on the speed of the vehicle.

5. The notification control method according to claim 1, wherein the imaging device is an in-vehicle camera mounted on a vehicle, and the notification control method further comprises controlling a timing at which the notification is performed, based on a distance between the object and the vehicle or a predicted period of time of arrival at the object.

6. A notification control device comprising:
a memory; and
a processor coupled to the memory and configured to:
acquire image data of a displayable image from an imaging device which captures a capturing area,
acquire sensing data from an object detection sensor which detects an object within measuring area overlapping the capturing area;
determine a visibility for the displayable image by
generating a luminance histogram based on luminance information of the image data,
calculating a dynamic range in the luminance histogram, and
determining the visibility for the displayable image based on the dynamic range; and
control a notification by a device to notify a detection of the object by the object detection sensor, in response to the dynamic range for the determined visibility for the displayable image being equal to or less than a threshold.

7. The notification control device according to claim 6, wherein the determining the visibility for the displayable image comprises:
dividing the image data into a plurality of regions, and determining the visibility for the displayable image for the plurality of regions.

8. The notification control device according to claim 7, wherein at least one region, from among the plurality of regions, is identified as corresponding to a range where the object has been detected based on the sensing data from the object detection sensor, and the visibility for the displayable image is determined based on luminance information of the at least one identified region.

9. The notification control device according to claim 6, wherein the imaging device is an in-vehicle camera mounted on a vehicle, the processor is further configured to acquire a speed of the vehicle, and control the notification based on the speed of the vehicle.

10. The notification control device according to claim 6, wherein the imaging device is an in-vehicle camera mounted on a vehicle, and the processor is further configured to control a timing at which the notification is performed, based on a distance between the object and the vehicle or a predicted period of time of arrival at the object.

11. A non-transitory computer-readable recording medium storing a notification control program for causing a computer to execute a procedure, the procedure comprising:
acquiring image data of a displayable image from an imaging device which captures a capturing area, and
acquiring sensing data from an object detection sensor which detects an object within measuring area overlapping the capturing area;
determining a visibility for the displayable image by
dividing the image data into a plurality of regions;
determining the visibility for the displayable image for the plurality of regions,
identifying at least one region among the plurality of regions corresponding to a range where the object has been detected based on the sensing data from the object detection sensor; and
determining the visibility for the displayable image based on luminance information of the at least one identified region;
controlling a notification by a device to notify a detection of the object by the object detection sensor, in response to the determined visibility for the displayable image based on the luminance information of the at least one identified region in the image data.

12. The non-transitory computer-readable recording medium according to claim 11, wherein the determining the visibility for the displayable image comprises:
generating a luminance histogram based on luminance information of the image data, and
calculating a dynamic range in the luminance histogram to determine the visibility for the displayable image.

13. The non-transitory computer-readable recording medium according to claim 12,
wherein the notification by the device is controlled in response to the dynamic range of the determined visibility for the displayable image being equal to or less than a threshold.

14. The non-transitory computer-readable recording medium according to claim 11,
wherein the imaging device is an in-vehicle camera mounted on a vehicle, the procedure further comprises acquiring a speed of the vehicle, and the controlling controls the notification based on the speed of the vehicle.

* * * * *